(12) United States Patent
Biskeborn et al.

(10) Patent No.: US 9,036,296 B2
(45) Date of Patent: May 19, 2015

(54) MULTIPLE WRITERS WITH REDUCED CROSSTALK

(71) Applicant: International Business Machines Corporation, Armonk, NY (US)

(72) Inventors: Robert G. Biskeborn, Hollister, CA (US); Philipp Herget, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/869,884

(22) Filed: Apr. 24, 2013

(65) Prior Publication Data

US 2014/0320997 A1 Oct. 30, 2014

(51) Int. Cl.
G11B 5/29 (2006.01)
G11B 5/265 (2006.01)

(52) U.S. Cl.
CPC . *G11B 5/29* (2013.01); *G11B 5/265* (2013.01)

(58) Field of Classification Search
CPC ......................................................... G11B 5/29
USPC .......................................................... 360/121
See application file for complete search history.

(56) References Cited

U.S. PATENT DOCUMENTS

| | | | | |
|---|---|---|---|---|
| 2,702,835 | A * | 2/1955 | Camras | 360/121 |
| 4,369,476 | A * | 1/1983 | Karsh | 360/123.01 |
| 4,819,111 | A | 4/1989 | Keel et al. | |
| 6,646,828 | B1 | 11/2003 | Sasaki | |
| 7,212,367 | B2 | 5/2007 | Clinton et | |
| 7,729,092 | B1 | 6/2010 | Mallary et al. | |
| 8,164,853 | B2 | 4/2012 | Hirata et al. | |
| 8,179,635 | B2 | 5/2012 | Schabes et al. | |
| 2005/0190493 | A1 | 9/2005 | Takano et al. | |
| 2010/0246061 | A1 | 9/2010 | Sechi | |
| 2011/0102116 | A1 | 5/2011 | Biskeborn et al. | |
| 2011/0273796 | A1 | 11/2011 | Biskeborn et al. | |
| 2011/0273797 | A1 | 11/2011 | Biskeborn et al. | |
| 2012/0050921 | A1 | 3/2012 | Marshall | |

FOREIGN PATENT DOCUMENTS

| | | |
|---|---|---|
| EP | 0 548 511 A1 | 6/1993 |
| WO | 97/22965 A1 | 6/1997 |

OTHER PUBLICATIONS

Schabes et al., "Micromagnetic Modeling of Soft Underlayer Magnetization Processes and Fields in Perpendicular Magnetic Recording," 2002 IEEE, IEEE Transactions on Magnetics, vol. 38, No. 4, Jul. 2002, pp. 1670-1675.

Yamakawa et al., "Single-pole recording head design for 100Gbpsi perpendicular magnetic recording," 2001 Elsevier Science B.V., Journal of Magnetism and Magnetic Materials, vol. 235, 2001, pp. 354-361.

* cited by examiner

*Primary Examiner* — Craig A. Renner
(74) *Attorney, Agent, or Firm* — Zilka-Kotab, PC

(57) ABSTRACT

A system according to one embodiment includes at least two write transducers for writing to a magnetic medium; and a low reluctance path from a first pole of a first of the write transducers to a second pole of a second of the write transducers. In another embodiment, either 1) the first pole of the first write transducer and the second pole of the second write transducer are positioned close enough to each other that a low reluctance path is present from the first pole of the first write transducer to the second pole of the second write transducer, or 2) a magnetic strap extends between the first pole of the first write transducer and the second pole of the second write transducer thereby creating a low reluctance path therebetween.

18 Claims, 12 Drawing Sheets

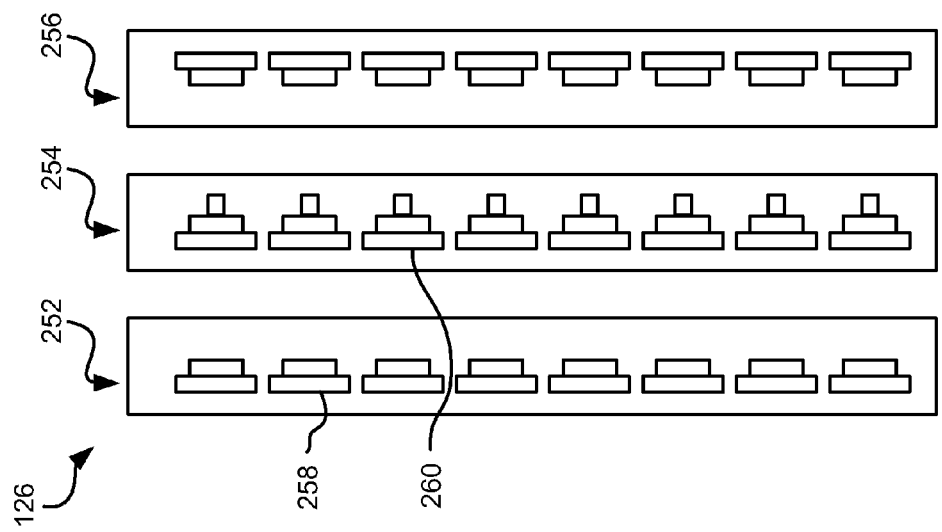
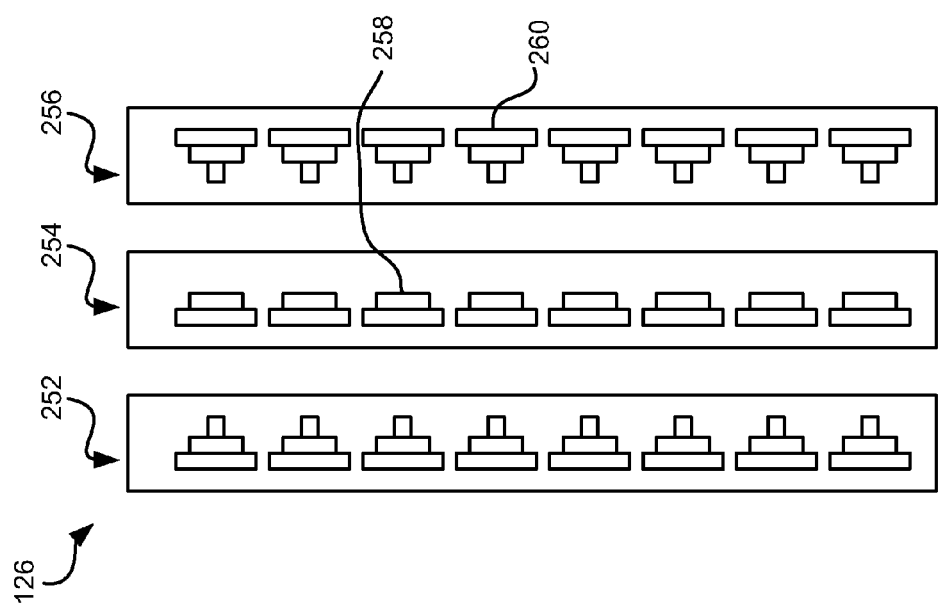

MULTIPLE WRITERS WITH REDUCED CROSSTALK

BACKGROUND

The present invention relates to data storage systems, and more particularly, this invention relates to magnetic heads and storage systems having reduced crosstalk.

In magnetic storage systems, data is read from and written onto magnetic recording media utilizing magnetic transducers commonly. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track density on recording tape, and decreasing the thickness of the magnetic tape medium. However, the development of small footprint, higher performance tape drive systems has created various problems in the design of a tape head assembly for use in such systems.

In a tape drive system, magnetic tape is moved over the surface of the tape head at high speed, where multiple writers operate at the same time to write data to the tape. However, as the spacing between the writers becomes smaller and smaller, problems, such as crosstalk, bit flipping, etc., tend to emerge more frequently.

Crosstalk is a phenomenon that occurs when two adjacent writers perform writing operations at about the same time. Particularly, crosstalk is present where the written portion for a first writer is affected by the magnetic flux created by an adjacent second writer, thereby degrading or otherwise adversely affecting the written information from the first writer. For example, stray flux generated by a powered writer will take a path from the top pole to the bottom pole of the writer, in the surrounding space. If a second writer is present and close to the first writer, the stray flux of the powered writer will pass through the second writer, taking a path through the top and bottom poles of the second writing. As the flux passes through the second writer structure, a portion of it also passes through the gap of the second writer, and can alter the pattern written by the second writer, leading to degradation of the written data pattern.

The writers do not need to be active simultaneously; crosstalk may emerge even upon performing writing operations within a few nanoseconds of each other, depending on the write gap of the particular head being used.

It would be favorable to reduce or eliminate crosstalk between adjacent write transducers to improve writing operation efficiency and accuracy.

SUMMARY

A system according to one embodiment includes at least two write transducers for writing to a magnetic medium; and a low reluctance path from a first pole of a first of the write transducers to a second pole of a second of the write transducers.

A system according to one embodiment includes at least two write transducers for writing to a magnetic medium. A first pole of a first of the write transducers is a top pole of the first write transducer, wherein a second pole of a second of the write transducers is a bottom pole of the second write transducer. Either 1) the first pole of the first write transducer and the second pole of the second write transducer are positioned close enough to each other that a low reluctance path is present from the first pole of the first write transducer to the second pole of the second write transducer, or 2) a magnetic strap extends between the first pole of the first write transducer and the second pole of the second write transducer thereby creating a low reluctance path therebetween. No point of a second pole of the first transducer and the second pole of the second write transducer lie on a common plane oriented parallel to a plane of deposition of second pole of the first write transducer.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIG. 3 is a partial tape bearing surface view of a magnetic head having a write-read-write configuration.

FIG. 4 is a partial tape bearing surface view of a magnetic head having a read-write-read configuration.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic data storage systems, as well as operation and/or component parts thereof. For example, head structures are disclosed that are configured to reduce the effects of crosstalk from neighboring writers.

In one general embodiment, a system includes at least two write transducers for writing to a magnetic medium; and a low reluctance path from a first pole of a first of the write transducers to a second pole of a second of the write transducers.

In another general embodiment, a system includes at least two write transducers for writing to a magnetic medium. A first pole of a first of the write transducers is a top pole of the first write transducer, wherein a second pole of a second of the write transducers is a bottom pole of the second write transducer. Either 1) the first pole of the first write transducer and the second pole of the second write transducer are positioned close enough to each other that a low reluctance path is present from the first pole of the first write transducer to the second pole of the second write transducer, or 2) a magnetic strap extends between the first pole of the first write transducer and the second pole of the second write transducer thereby creating a low reluctance path therebetween. No point of a second pole of the first transducer and the second pole of the second write transducer lie on a common plane oriented parallel to a plane of deposition of second pole of the first write transducer.

Figure 1A:
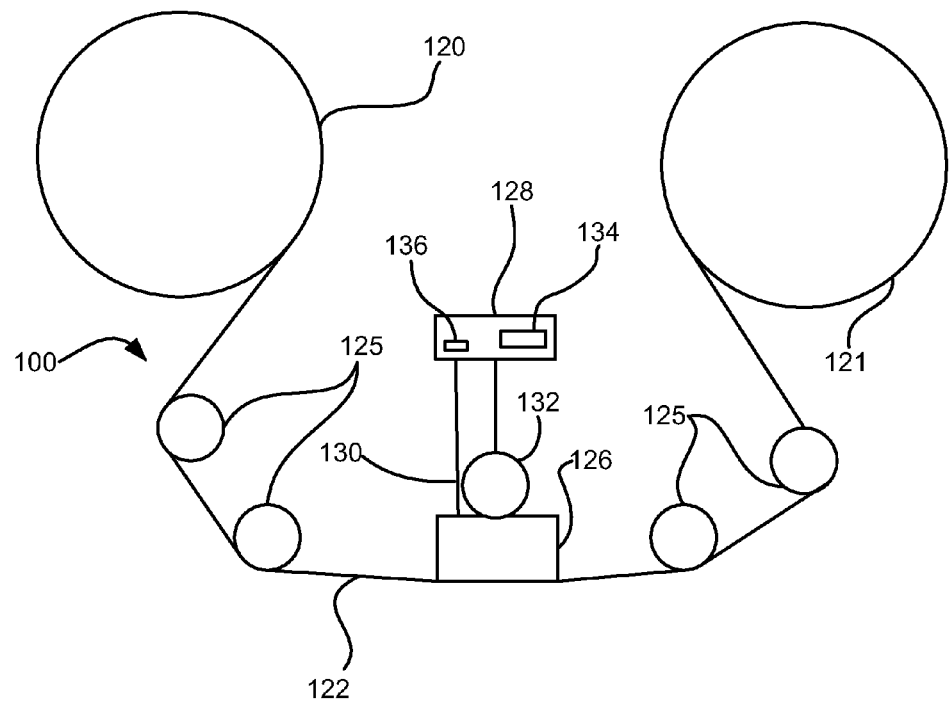
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may operate under logic known in the art, as well as any logic disclosed herein. The controller 128 may be coupled to a memory 136 of any known type, which may store instructions executable by the controller 128. Moreover, the controller 128 may be configured and/or programmable to perform or control some or all of the methodology presented herein. Thus, the controller may be considered configured to perform various operations by way of logic programmed into a chip; software, firmware, or other instructions being available to a processor; etc. and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (integral or external) to send and receive the data and for controlling the operation of the tape drive 100 and communicating the status of the tape drive 100 to the host, all as will be understood by those of skill in the art.

Figure 1B:
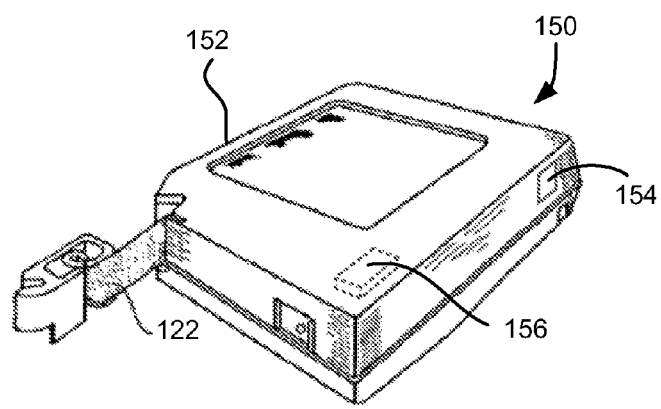
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2:
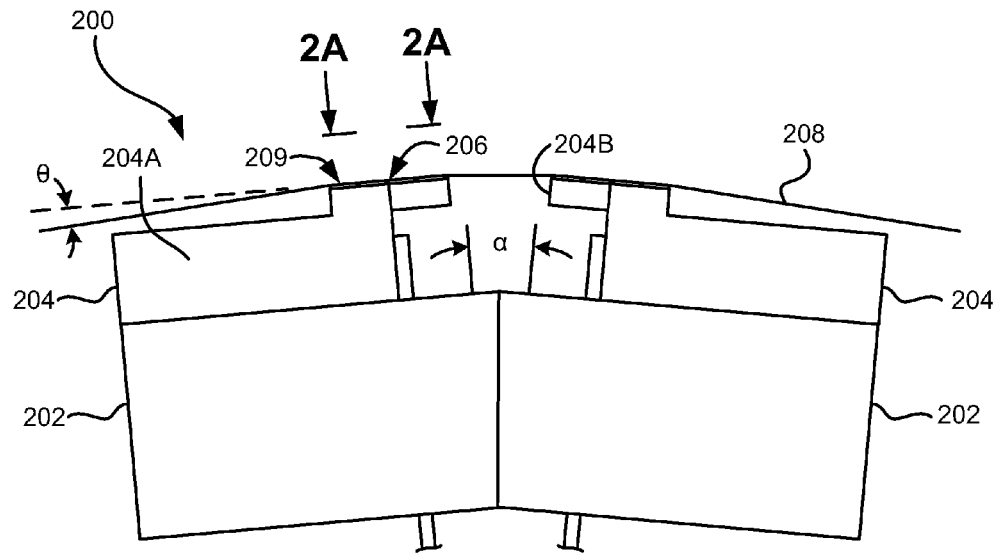
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 5 degrees.

The substrates 204A are typically constructed of a wear resistant material, such as a ceramic. The closures 204B made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
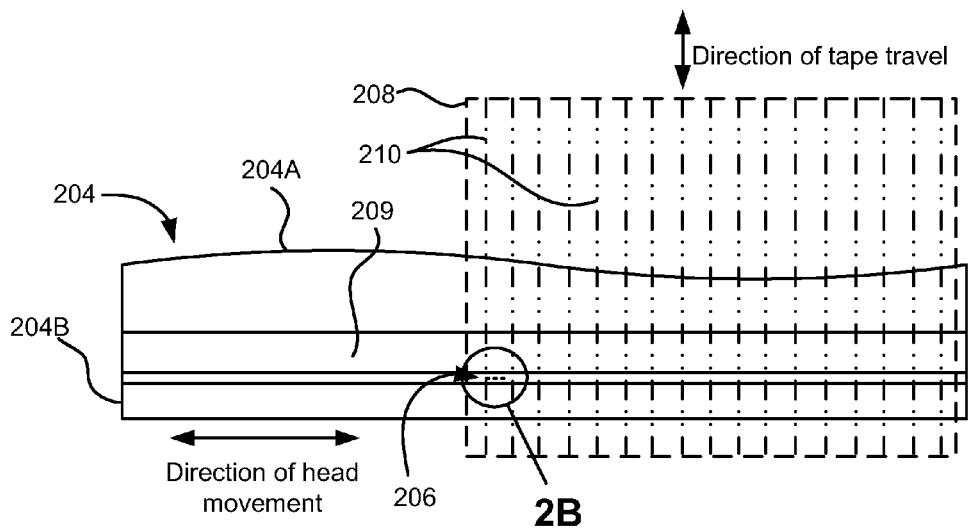
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 22 data bands, e.g., with 8 data bands and 9 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
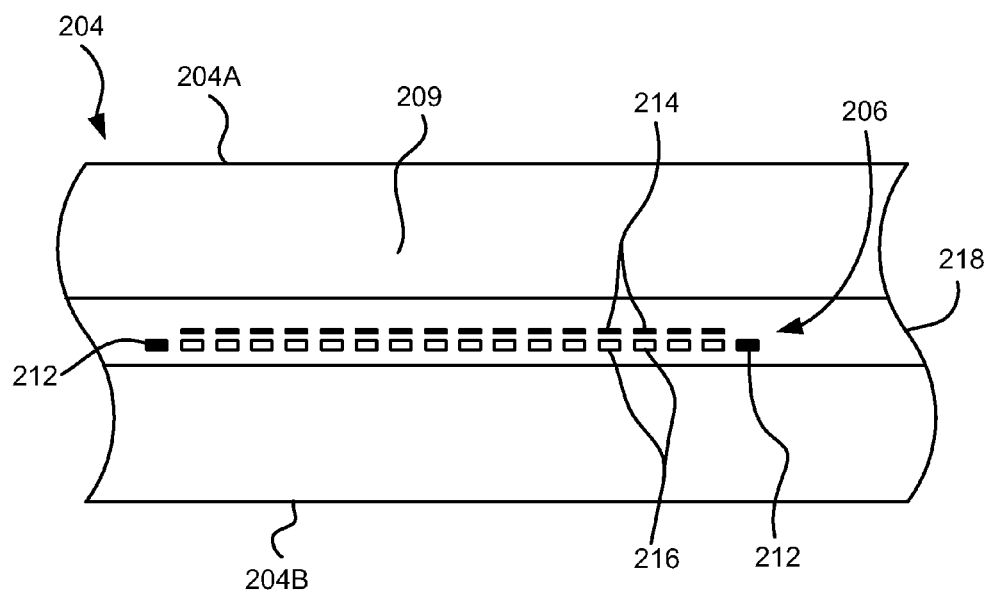
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
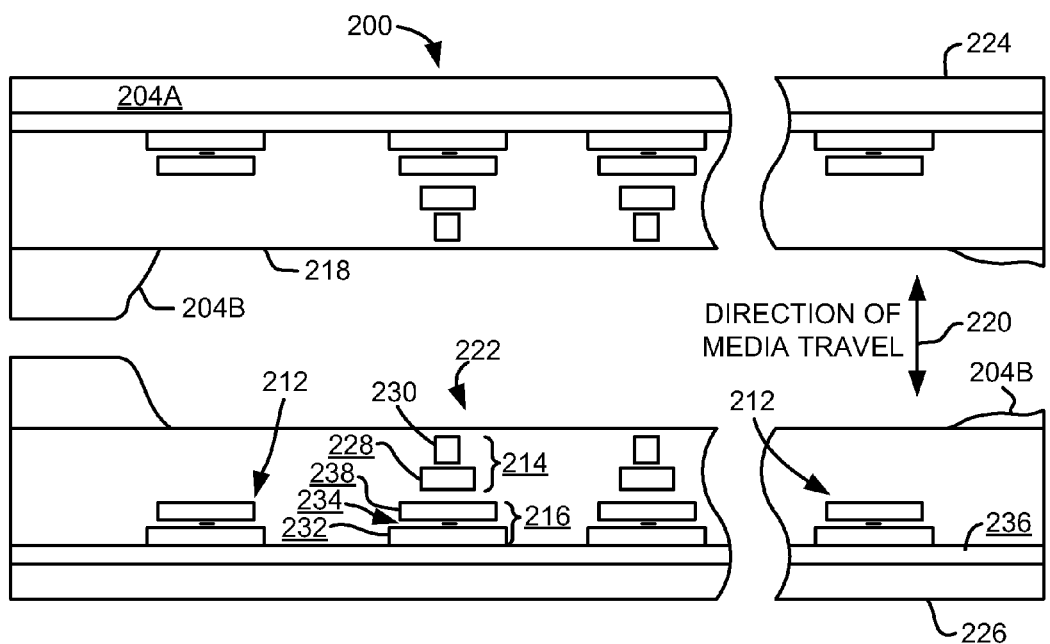
FIG. 2C is a detailed view of a partial tape bearing surface of a pair of modules.

FIG. 2C shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write head 214 and the readers, exemplified by the read head 216, are aligned parallel to a direction of travel of a tape medium thereacross to form an R/W pair, exemplified by the R/W pair 222.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (–), CZT or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
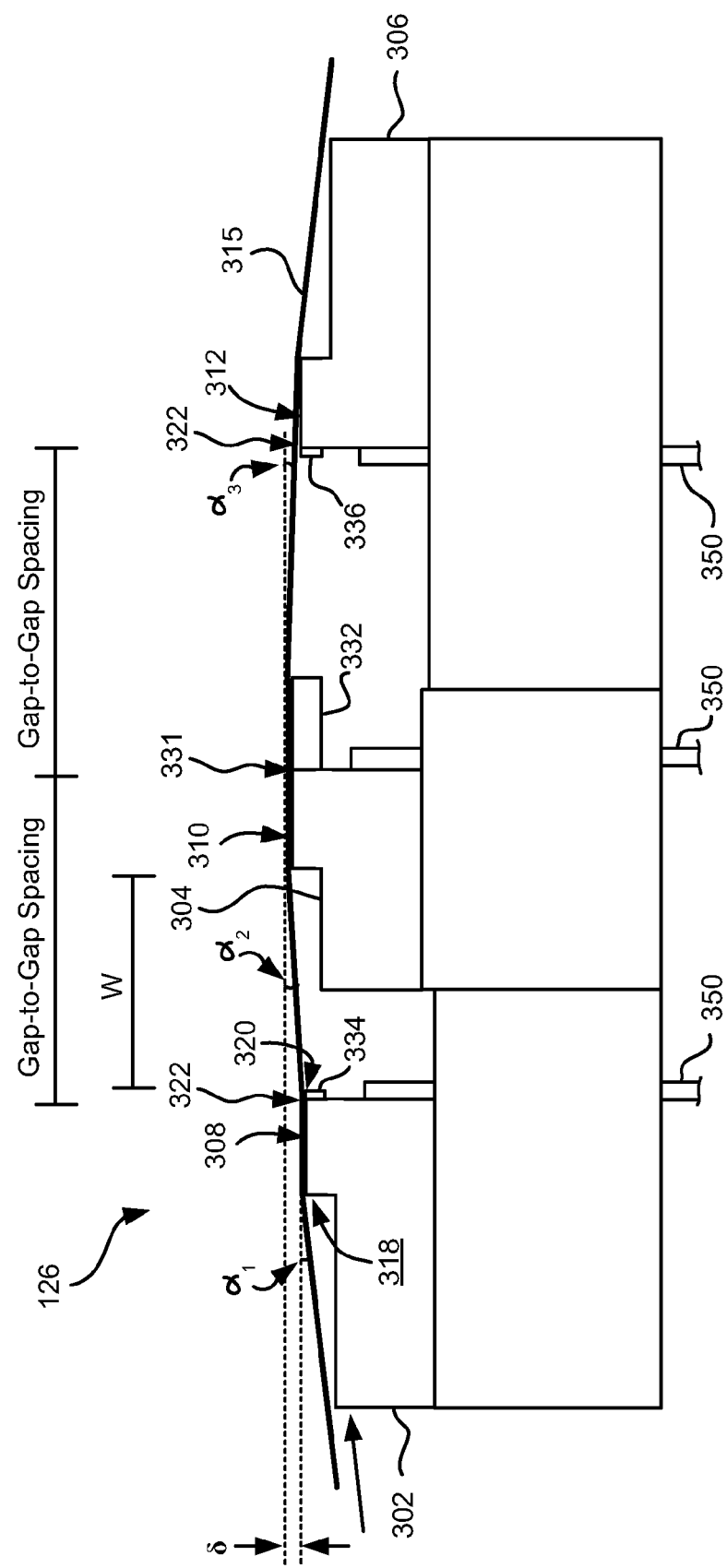
FIG. 5 is a side view of a magnetic tape head with three modules according to one approach where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
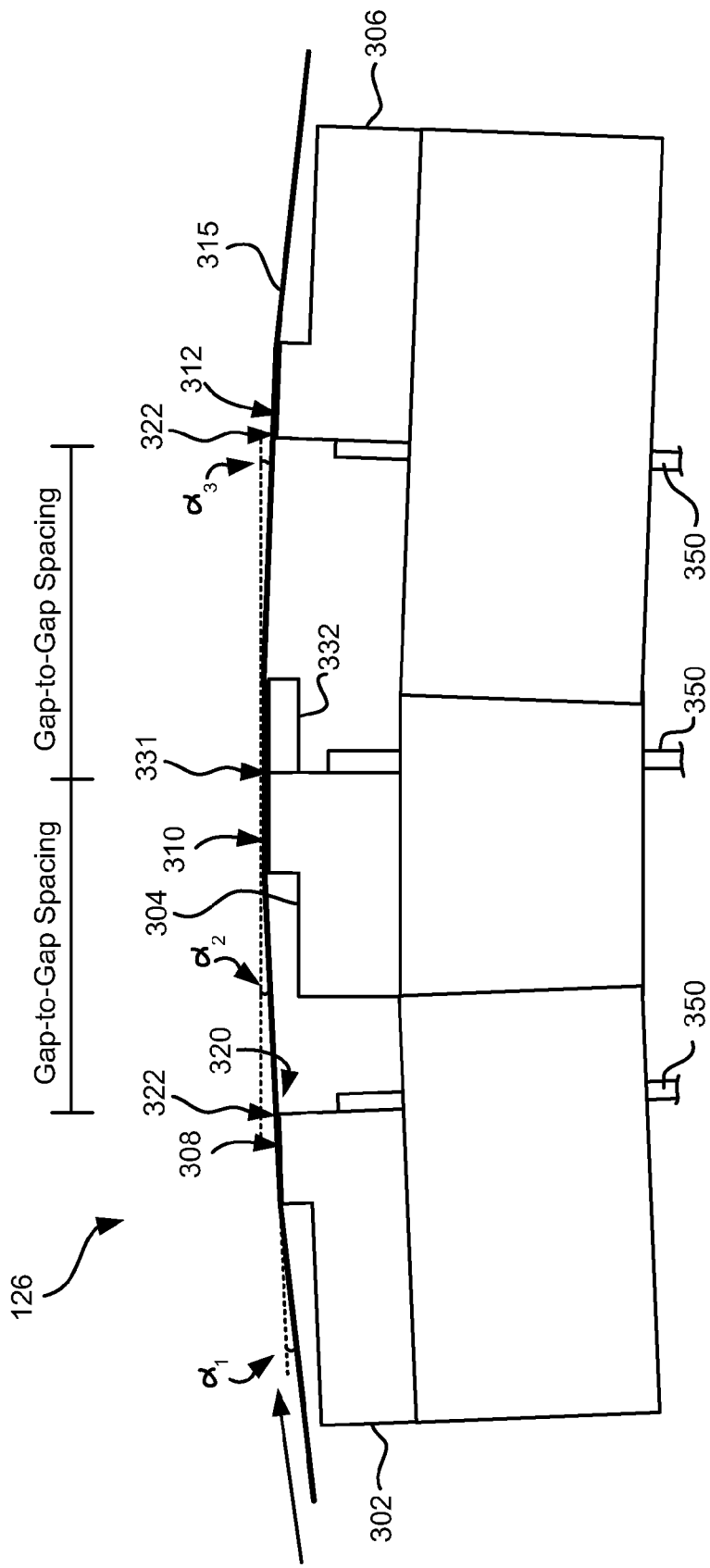
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.5° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one approach, the second module 304 includes a plurality of data and optional servo readers 331 and no writers. The first and third modules 302, 306 include a plurality of writers 322 and no readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 25-35 microns. However, irregularities on the tape may tend to droop into the gap and create gap erosion. Thus, the smaller the gap is the better. The smaller gap enabled herein exhibits fewer wear related problems.

In some approaches, the second module 304 has a closure, while the first and third modules 302, 306 do not have a closure. Where there is no closure, preferably a hard coating is added to the module. One preferred coating is diamond-like carbon (DLC).

In the approach shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than standard LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for writeread-write applications. Additional aspects of these embodiments are similar to those given above.

Typically, the tape wrap angles may be set about midway between the embodiments shown in FIGS. 5 and 6.

Figure 7:
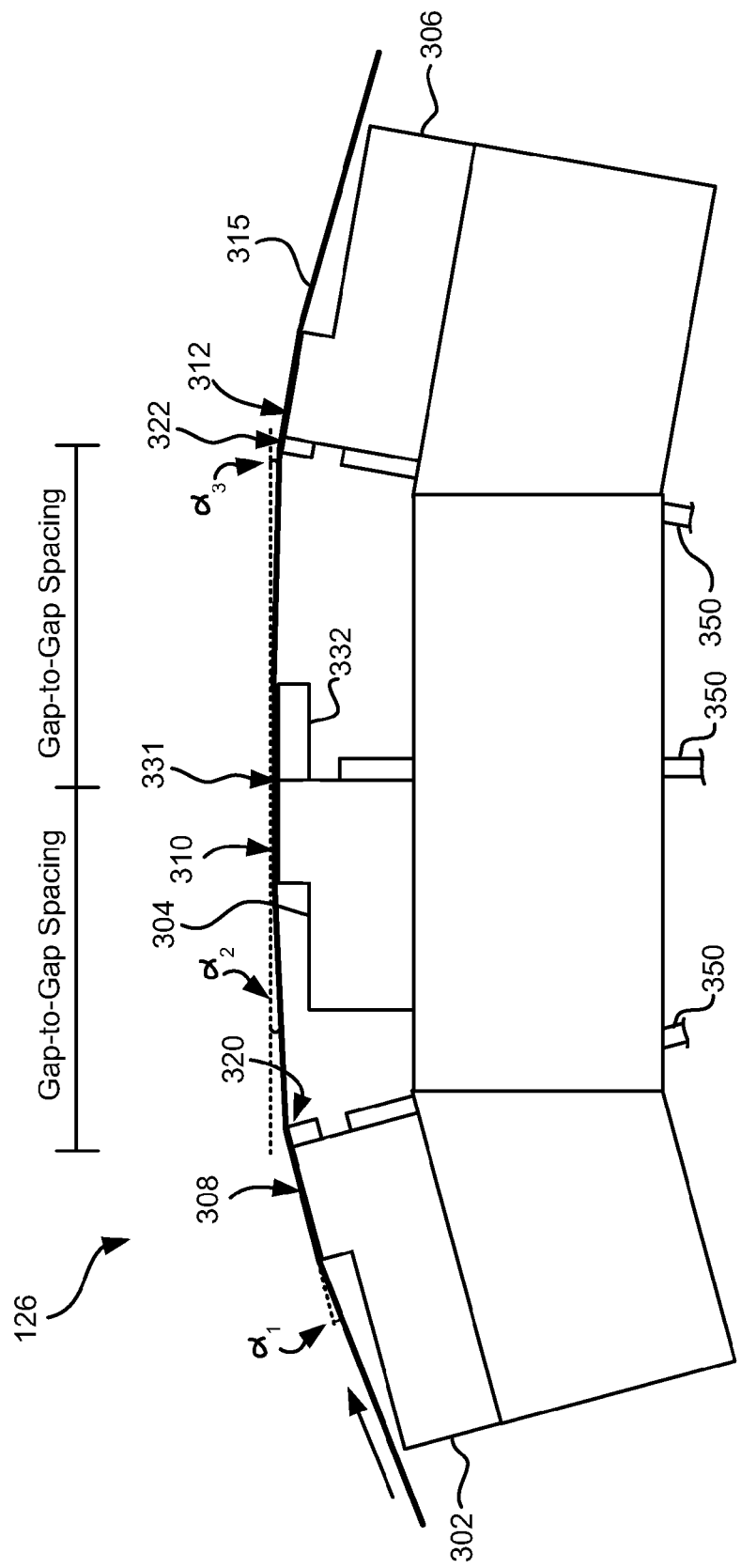
FIG. 7 is a side view of a magnetic tape head with three modules in an overwrap configuration.

FIG. 7 illustrates an approach where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore a preferred embodiment has a write-read-write configuration, which may use shortened closures that thus allow closer gap-to-gap separation.

Additional aspects of the approaches shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. For example, rollers having an offset axis may be used to set the wrap angles. The offset axis creates an orbital arc of rotation, allowing precise alignment of the wrap angle $\alpha_1$.

To assemble any of the approaches described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads.

As noted above, crosstalk is a phenomenon that occurs when two adjacent writers perform writing operations at about the same time, which can lead to undesirable results. Particularly, crosstalk is created when an active first writer is interfered with by the magnetic flux created by an adjacent second writer, thereby degrading or otherwise adversely affecting the written information from the first writer.

Stray flux generated by a powered writer will take a path from the top pole to the bottom pole of the writer, in the space surrounding the writer. If a second writer is present and close to the first writer, the stray flux of the powered writer will pass through the second writer, taking a path through the top and bottom poles of the second writer. As the flux passes through the second writer structure, a portion of it also passes through the gap of the second writer, and can alter the pattern written by the second writer, leading to an undesirable degradation of the written data pattern. The writers do not need to be active simultaneously; crosstalk may emerge even upon performing writing operations within a few nanoseconds of each other, depending on the write gap of the particular head being used.

It would be favorable to reduce or eliminate crosstalk between adjacent writers to improve writing operation efficiency and accuracy for closely pitched writers. Embodiments described and/or suggested herein may include write transducers built with a controlled reluctance between the top pole of one write transducer and the bottom pole of its neighbor. This controlled reluctance preferably provides an alternate return path for the stray flux from a powered write transducer, and minimizes the flux passing through the gap of the neighboring write transducer.

Figure 8A:
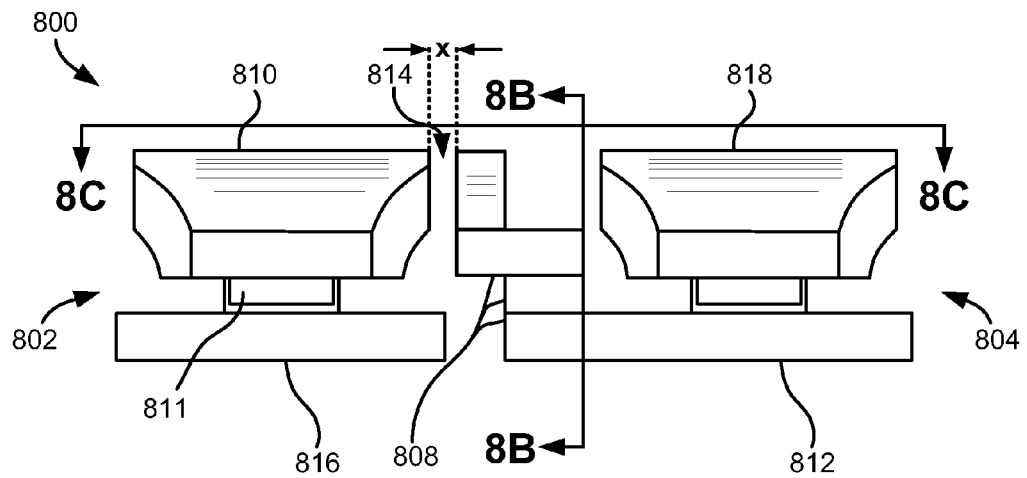
FIG. 8A is a partial side view of a magnetic tape head having multiple write transducers according to one embodiment.
Figure 8B:
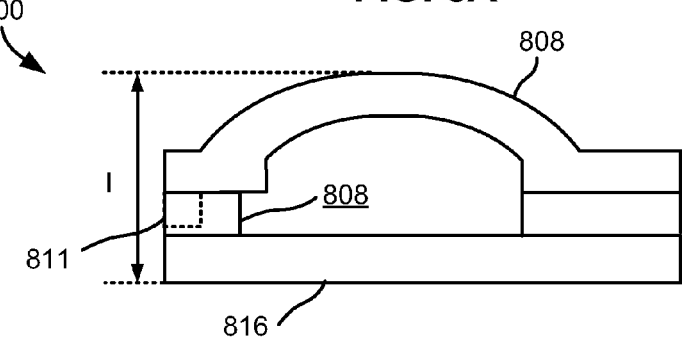
FIG. 8B is a cross sectional view of the head of FIG. 8A taken along line 8B.
Figure 8C:
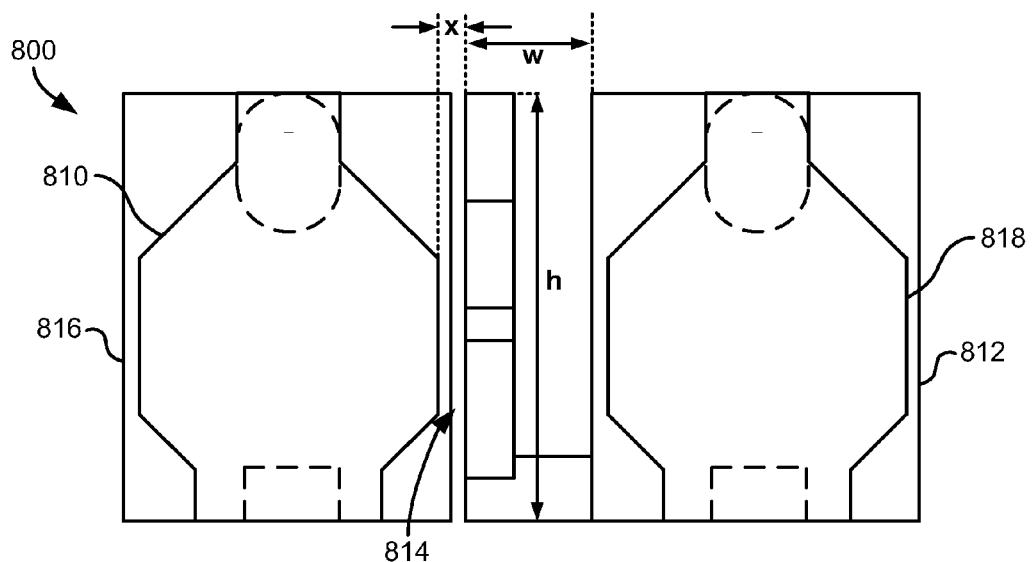
FIG. 8C is a top-down view of the head of FIG. 8A taken along line 8C.

FIGS. 8A-8C depict a system 800, in accordance with one embodiment. As an option, the present system 800 may be implemented in conjunction with features from any other embodiment listed herein, such as those described with reference to the other FIGS. Of course, however, the system 800 and others presented herein may be used in various applications and/or in permutations, which may or may not be specifically described in the illustrative embodiments listed herein. Further, the system 800 presented herein may be used in any desired environment.

As illustrated in FIGS. 8A-8C, two write transducers 802, 804 of a potentially larger array are provided for writing to a magnetic medium. Such array may be present in a magnetic head. FIG. 8A depicts the partial view when looking at the media facing surface. In a preferred approach, the magnetic medium may include a magnetic recording tape, but is not limited thereto. Moreover, according to various approaches, the system 800 may include any desirable number of write transducers, e.g., at least two, at least three, at least four, multiple, etc. In other approaches, the write transducers may include any configuration described and/or suggested herein, depending on the desired embodiment.

Referring to FIG. 8A, the write transducer 802 includes an upper write pole 810, a lower pole 816, a pole tip 811 extending from the upper write pole 810 and defining a write gap between the pole tip 811 and the lower pole 816. The other write transducer 804 has a similar construction.

With continued reference to FIGS. 8A-8C, the system 800 also includes a low reluctance path, having a magnetic strap 808 and a nonmagnetic gap 814, described in further detail below. As illustrated, the low reluctance path extends from a first pole 810 of a first write transducer 802 to a second pole 812 of a second write transducer 804. However, in another approach, the low reluctance path may extend from a second pole 816 of the first write transducer 802 to a first pole 818 of the second write transducer 804, depending on the desired embodiment.

As described above, a low reluctance path may preferably provide an alternate return path for stray flux from a powered write transducer, thereby minimizing the flux passing through the gap of the neighboring write transducer. The low reluctance path also has a controlled amount of reluctance. In this embodiment, the amount of reluctance is determined by the dimensions of the strap 808 and the gap 814. One skilled in the art can determine the appropriate dimensions needed to minimize the crosstalk between the writers. According to various embodiments, the low reluctance path may also include any number of approaches described and/or suggested herein, to achieve a desired reluctance, depending on the embodiment. Experimentation has shown that the reluctance value of the low reluctance path is an important factor in determining the amount of stray flux returned to a powered write transducer, as will be discussed in further detail below (see description of FIG. 9).

With continued reference to FIGS. 8A-8C, according to one approach, the low reluctance path may include a magnetic strap 808, e.g., of a magnetically permeable material. In various approaches, the magnetic strap may include materials that are the same or different than at least one of the poles in any of the approaches described and/or suggested herein, or any other suitable material which would be apparent to one skilled in the art upon reading the present description. Illustrative materials for the magnetic strap may include iron alloys, such as NiFe and/or CoFe; or any other magnetically permeable material.

The magnetic strap may preferably magnetically connect the top pole of one write transducer to the bottom pole of its neighboring write transducer, e.g., to direct stray flux. As illustrated, the magnetic strap 808, may extend between the first pole 810 of the first write transducer 802 and the second pole 812 of the second write transducer 804, but is not limited thereto. According to different approaches, the location at which the magnetic strap may magnetically connect to the top and/or bottom pole of the write transducers along their length, may also determine the reluctance of the low reluctance path. Thus, depending on the desired embodiment, the magnetic strap may be connected to the bottom and/or top pole along either of the poles' lengths.

According to yet another approach, the permeability of the magnetic strap may be selected to achieve the desired reluctance of the low reluctance path between the write transducers. In one embodiment, the magnetic strap may have a different permeability than the top and bottom poles. According to an illustrative approach, the magnetic permeability of the magnetic strap may preferably be higher than a magnetic permeability of air and/or lower than the magnetic permeability of a nearest one of the poles.

Moreover, in different approaches, the various dimensions, e.g., height h, width w, vertical length l, etc. of the magnetic strap 808 may be adjusted, e.g., tuned, to achieve the desired reluctance value for the low reluctance path. However, the dimensions of a nonmagnetic gap may also be selected to set the reluctance value of the low reluctance path, as will soon become apparent.

With continued reference to FIGS. 8A-8C, the low reluctance path may also include a nonmagnetic gap 814, e.g., a gap of nonmagnetic material such as alumina, ruthenium, etc.; an air gap; a void; etc., at one or more locations, as discussed in more detail below. Depending on the desired embodiment, the width x and/or other dimensions of the nonmagnetic gap may be adjusted, e.g., tuned, to achieve the desired reluctance for the low reluctance path. Thus, the low reluctance path may include a nonmagnetic gap 814 of predefined size e.g., as determined by modeling, between the first pole 810 of the first write transducer 802 and the second pole 812 of the second write transducer 804.

Figure 9:
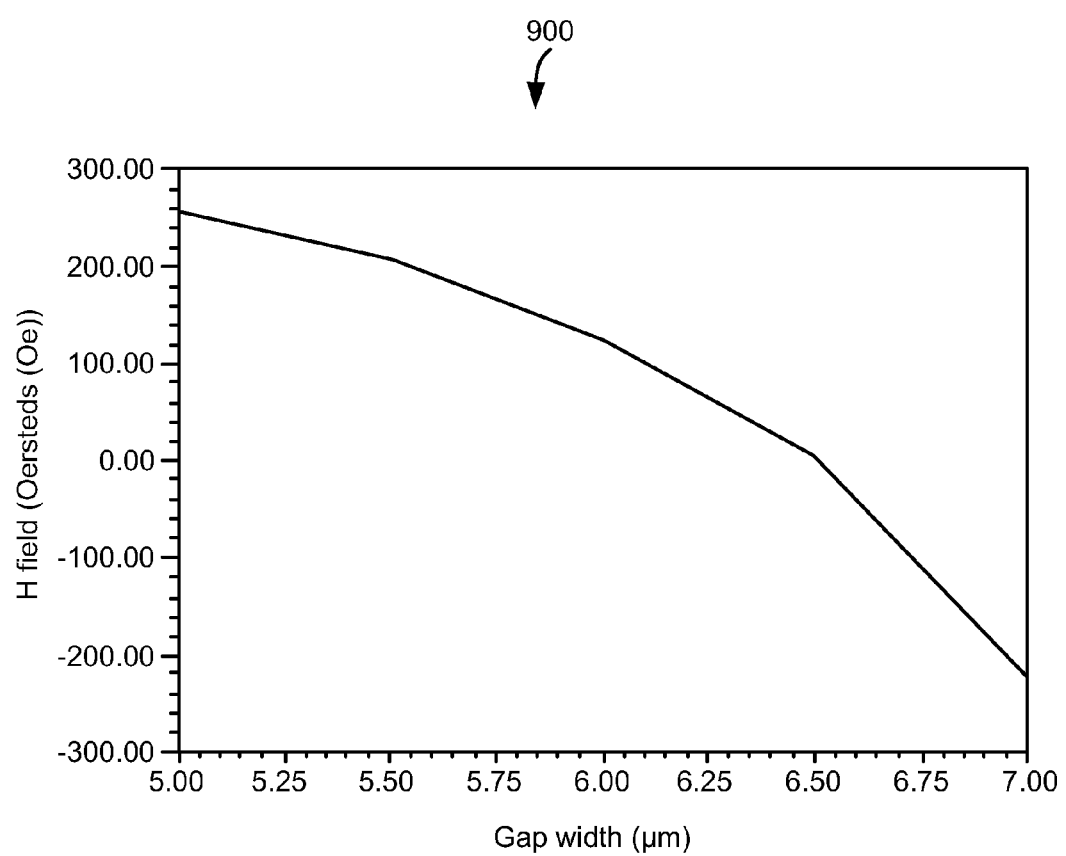
FIG. 9 is a graph according to one embodiment.

FIG. 9 includes a graph 900, illustrating Finite Element Method (FEM) simulations of an exemplary embodiment configured as shown in FIGS. 8A-8C, which are in no way intended to limit the invention. The graph 900 of FIG. 9, plots data corresponding to the magnitude of the magnetic field (H field) in the gap of the unpowered write transducer vs. the size of the gap between the magnetic strap and top writer pole of the exemplary embodiment. During simulation, the size of the gap between the magnetic strap and top writer pole of the unpowered write transducer was varied to control the reluctance value of the low reluctance path between the write transducers. With reference to the graph 900 of FIG. 9, when the size of the gap was about 6.5 μm, the H field generated in the gap of the unpowered write transducer was found to be eliminated. Thus the graph 900 illustrates that the amount of stray flux returned to the powered write transducer by the low reluctance path of a given embodiment depends on its reluctance value.

According to various approaches, the nonmagnetic gap may be positioned between a magnetic strap and a first pole of the first write transducer (see FIGS. 8A-8C), between a magnetic strap and the second pole of the second write transducer, between portions of a magnetic strap itself (see FIG. 10C), or combinations thereof (e.g., more than one nonmagnetic gap). Therefore, according to different approaches, the magnetic strap may be in physical contact with at least one of, neither, or both a first pole of a first write transducer and a second pole of a second write transducer.

With continued reference to FIGS. 8A-8C, the first pole 810 of the first write transducer 802 may be a top pole of the first write transducer 802, while the second pole 812 of the second write transducer 804 may be a bottom pole of the second write transducer 804. Moreover, the first pole 810 of the first write transducer 802 and the first pole 818 of the second write transducer 804 may lie along a common plane, and the second pole 816 of the first write transducer 802 and the second pole 812 of the second write transducer 804 may lie along a second common plane. As illustrated in FIGS. 8A-8C, it is preferable that the common plane and/or second common plane are oriented about parallel to a plane of deposition of the poles, but is not limited thereto. In some approaches, write transducers may be positioned such that alternate write transducers are positioned on different planes, as will soon become apparent.

Figure 10A:
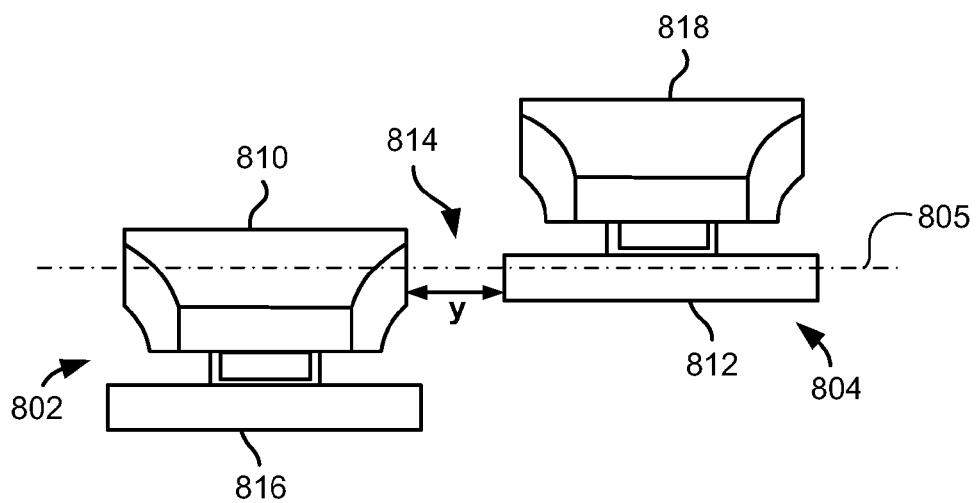
FIG. 10A is a partial side view of two write transducers of a magnetic tape head according to one embodiment.
Figure 10B:
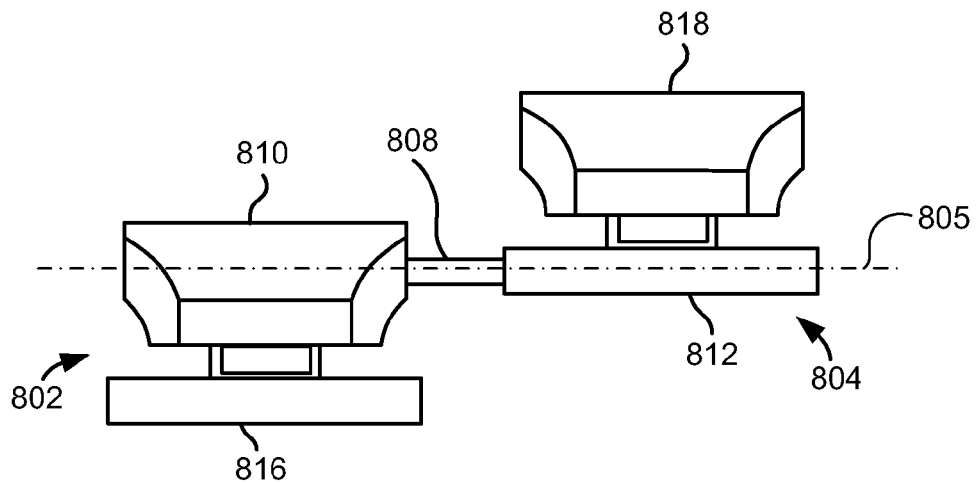
FIG. 10B is a partial side view of two write transducers of a magnetic tape head according to one embodiment.
Figure 10C:
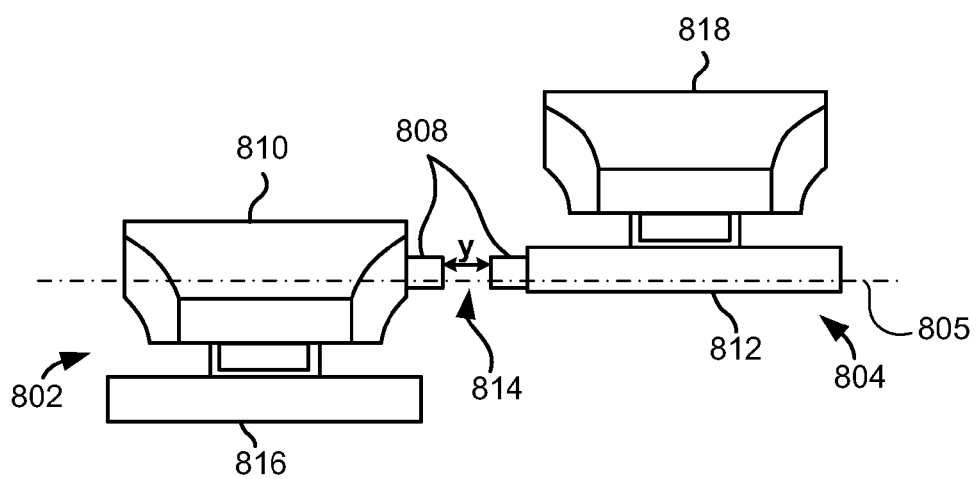
FIG. 10C is a partial side view of two write transducers of a magnetic tape head according to one embodiment.

With reference now to FIGS. 10A-10C, according to one embodiment, the first pole 810 of the first write transducer 802 and the second pole 812 of the second write transducer 804 lie along an imaginary common plane 805. As mentioned above, it is preferable that the common plane is oriented about parallel to a plane of deposition of the poles, but is not limited thereto. Furthermore, as illustrated in FIGS. 10A-10B, the second pole 816 of the first write transducer 802 may lie below the common plane, and the first pole 818 of the second write transducer 804 may lie above the common plane. However, as illustrated in FIG. 10C, according to another approach, the second pole 816 of the first write transducer 802 may lie above the common plane, and the first pole 818 of the second write transducer 804 may lie below the common plane. No point of the second pole 816 of the first transducer and the second pole 812 of the second write transducer lie on a common plane oriented parallel to a plane of deposition of second pole 816 of the first write transducer.

In one approach, as illustrated in FIG. 10A, the orientation of the write transducers may allow a low reluctance path to be formed between the first pole 810 of the first write transducer 802 and the second pole 812 of the second write transducer 804 by physically displacing the write transducers, thereby forming a nonmagnetic gap 814. In the illustrative embodiment of FIG. 10A, the size y of the nonmagnetic gap separating the write transducers may control the reluctance between the poles. The reluctance can therefore be controlled by changing the size (e.g., thickness and/or width) of the pole and/or changing the writer pitch, thereby effecting the separation between the write transducers. According to various other approaches, the nonmagnetic gap may include any of the embodiments described and/or suggested herein, in any combination, e.g., to provide a path between the top and bottom pole with the desired reluctance. Thus, the nonmagnetic gap may be sized and/or include certain materials such that the desired reluctance between the write transducers is achieved, depending on the embodiment.

With reference to FIG. 10B, a magnetic strap 808 may be added between the write transducers to tune the reluctance of the low reluctance path between the write transducers as previously described with reference to the description of FIGS. 8A-8C. As illustrated, a magnetic strap 808 extends between the first pole 810 of the first write transducer 802 and the second pole 812 of the second write transducer 804.

Preferably, the magnetic strap may include a magnetically permeable material, but according to various other approaches, the magnetic strap may be configured as in any of the embodiments described and/or suggested herein, with or without a nonmagnetic gap. Thus, in one approach, the size (e.g., width, height, length, etc.) and/or material included in the magnetic strap may be adjusted, e.g., tuned, preferably to achieve the desired reluctance of the low reluctance path.

Referring now to FIG. 10C, the second pole 816 of the first write transducer 802 lies above the common plane 805, and the first pole 818 of the second write transducer 804 lies below the common plane. Moreover, a nonmagnetic gap 814 and a magnetic strap 808 are positioned between the first pole 810 of the first write transducer 802 and the second pole 812 of the second write transducer 804. According to different approaches, the size of the nonmagnetic gap 814 and/or the magnetic strap 808 may be adjusted, e.g., tuned, preferably to achieve the desired reluctance of the low reluctance path between the two write transducers.

Figure 10D:
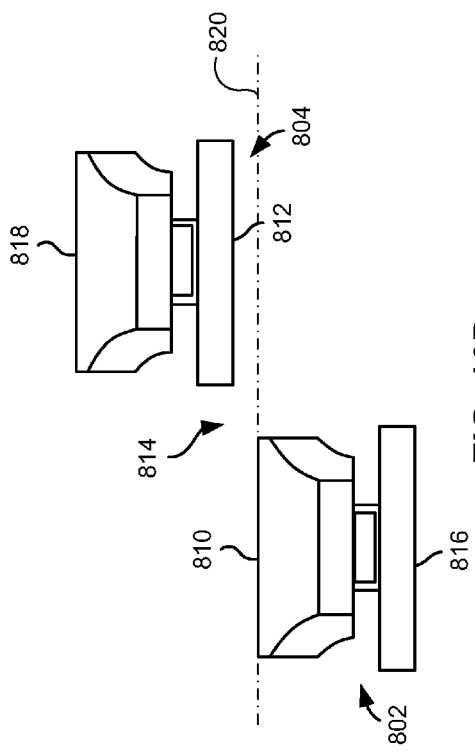
FIG. 10D is a partial side view of two write transducers of a magnetic tape head according to one embodiment.

In yet another approach, as depicted in FIG. 10D, the entire second pole of the second write transducer may lie above a plane 820 extending across an uppermost surface of the first pole of the first write transducer. As also depicted, the first pole 810 of the first write transducer 802 and the second pole 812 of the second write transducer 804 are positioned close enough to each other that a low reluctance path, e.g., across nonmagnetic gap 814, is present from the first pole of the first write transducer to the second pole of the second write transducer According to an example, which is in no way intended to limit the invention, the spacing between the first and second write transducers may be fixed, i.e., the size of the nonmagnetic gap is limited by the fixed spacing between the write transducers. Although the spacing between the write transducers is fixed, the size of the strap, e.g., width, height, etc. may be adjusted to gain the desired reluctance value of the low reluctance path therebetween. In various approaches, the height, width, permeability, length, etc. of the magnetic strap and/or nonmagnetic gap may be determined by modeling, calculations, experimentation, etc., or any other method which would be apparent to one skilled in the art upon reading the present description.

Although two write transducers 802, 804 are illustrated in FIGS. 8A-8C and 10A-10C, in other embodiments, a system may include any number of write transducers e.g., at least two, three, at least three, a plurality, etc. depending on the desired embodiment. Moreover, the write transducers may be positioned with any orientation relative to each other and/or the low reluctance path, preferably to achieve the desired reluctance between write transducers, depending on the embodiment.

Figure 11:
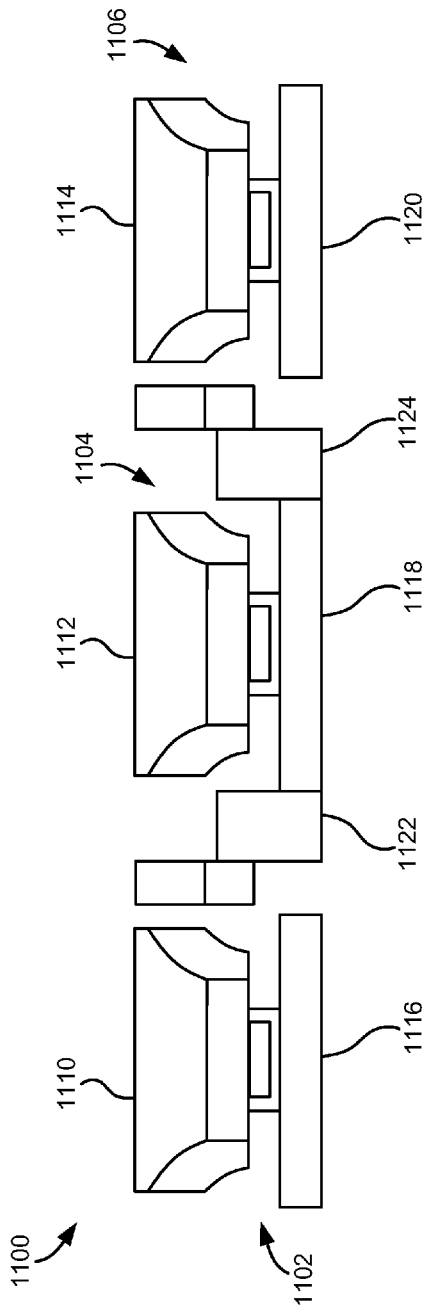
FIG. 11 is a partial side view of a magnetic tape head having multiple write transducers according to one embodiment.

FIG. 11 depicts a system 1100, in accordance with one embodiment. As an option, the present system 1100 may be implemented in conjunction with features from any other embodiment listed herein, such as those described with reference to the other FIGS. Of course, however, such system 1100 and others presented herein may be used in various applications and/or in permutations, which may or may not be specifically described in the illustrative embodiments listed herein. Further, the system 1100 presented herein may be used in any desired environment. Thus FIG. 11 (and the other FIGS.) should be deemed to include any and all possible permutations.

Referring now to FIG. 11, the system 1100 includes three write transducers 1102, 1104, 1106 for writing to a magnetic medium. In a preferred approach, the magnetic medium may include a magnetic recording tape, but is not limited thereto. Moreover, the write transducers 1102, 1104, 1106 each have a first pole 1110, 1112, 1114 and a second pole 1116, 1118, 1120, respectively. According to various approaches, the system 1100 and/or write transducers 1102, 1104, 1106 may include any of the approaches described and/or suggested herein, depending on the desired embodiment.

With continued reference to FIG. 11, the system 1100 includes a second low reluctance path 1124 from the second pole 1118 of the second write transducer 1104 to the first pole 1114 of the third write transducer 1106, in addition to the low reluctance path 1122. Although the low reluctance paths 1122, 1124 are shown in this embodiment as including a magnetic strap and a nonmagnetic gap, as stated above, the low reluctance path may include any of the approaches described and/or suggested herein, depending on the desired embodiment. Thus, in another approach, the second low reluctance path may extend from the first pole 1112 of the second write transducer 1104 to the second pole 1120 of the third write transducer 1106.

Depending on the desired embodiment, each of the low reluctance paths of a system having multiple write transducers may be the same or different than the other low reluctance paths included in that system. In different approaches, the magnetic straps and/or nonmagnetic gaps of the low reluctance paths may be the same or different in height, length, width, material, etc., while achieving the same reluctance value.

Figure 12A:
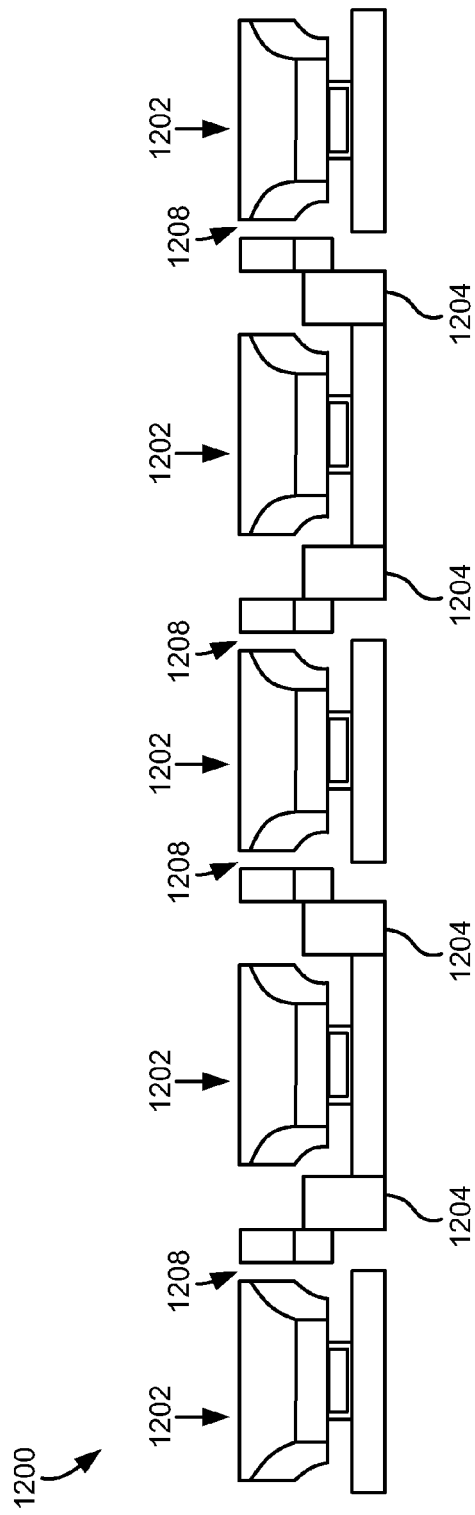
FIG. 12A is a partial side view of a magnetic tape head having multiple write transducers according to one embodiment.
Figure 12B:
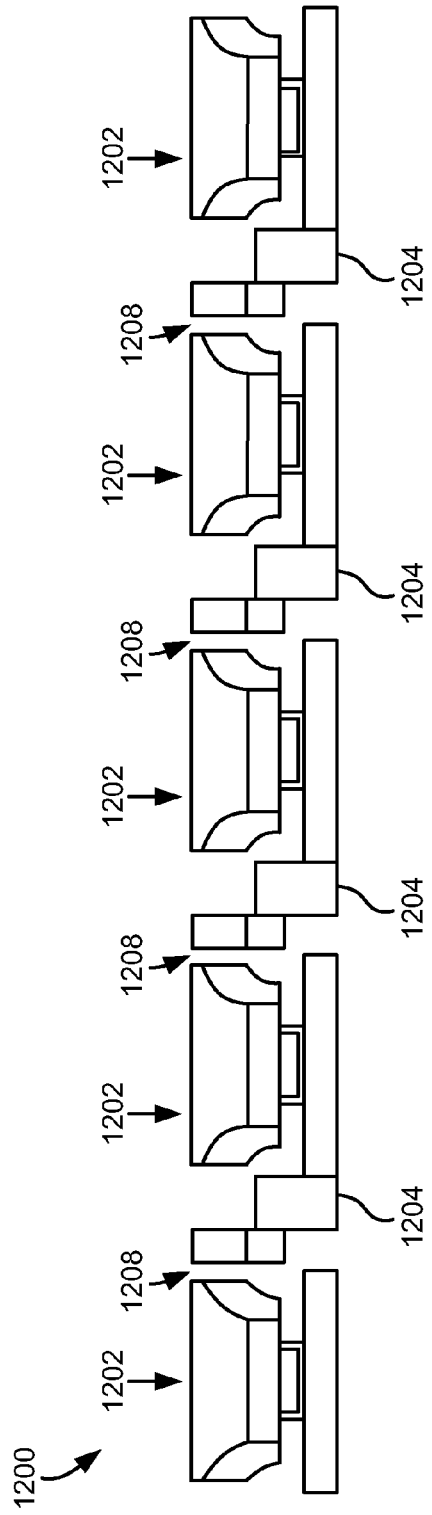
FIG. 12B is a partial side view of a magnetic tape head having multiple write transducers according to one embodiment.

FIGS. 12A-12B depict illustrative embodiments of a system 1200, in accordance with one embodiment. As an option, the present system 1200 may be implemented in conjunction with features from any other embodiment listed herein, such as those described with reference to the other FIGS. Of course, however, such system 1200 and others presented herein may be used in various applications and/or in permutations which may or may not be specifically described in the illustrative embodiments listed herein. Further, the system 1200 presented herein may be used in any desired environment. Thus FIGS. 12A-12B (and the other FIGS.) should be deemed to include any and all possible permutations.

Referring now to FIGS. 12A-12B, a system 1200 includes multiple write transducers 1202 for writing to a magnetic medium. The system 1200 also includes low reluctance paths having magnetic straps 1204 and nonmagnetic gaps 1208. According to different approaches, the magnetic straps 1204 and nonmagnetic gaps 1208 may include any approaches described and/or suggested herein.

FIGS. 12A-12B illustrate two different configurations for the low reluctance paths extending between the write transducers, which are no way intended to limit the invention. Although the low reluctance paths are oriented differently in FIGS. 12A-12B, the systems as a whole preferably operate similarly and/or the same.

According to another embodiment, which is in no way intended to limit the invention, the magnetic strap and/or nonmagnetic gap of the low reluctance path may be formed using the same and/or similar processes as used to form at least some parts of the write transducers. Thus, according to one approach, a bottom piece of a magnetic strap and/or nonmagnetic gap may be formed, at least in part, at the same time as at least one of the bottom yokes of the write transducers. Moreover, in another approach, a top piece of a magnetic strap and/or nonmagnetic gap may be formed, at least in part, at the same time as at least one of the top yokes of the write transducers. As a result, this may preferably reduce cost and/or time of manufacture.

Various embodiments are compatible with a "pancake" type write coil and/or a helical, or "barbershop pole," write coil configuration of conventional design.

It will be clear that the various features of the foregoing systems and/or methodologies may be combined in any way, creating a plurality of combinations from the descriptions presented above.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
   at least two write transducers for writing to a magnetic medium, each of the write transducers being separated from one another by a nonmagnetic gap; and
   a low reluctance path from a first pole of a first of the write transducers to a second pole of a second of the write transducers,
   wherein the low reluctance path includes a magnetic strap extending between the first pole of the first write transducer and the second pole of the second write transducer.

2. A system as recited in claim 1, wherein the first pole of the first write transducer is a top pole of the first write transducer, wherein the second pole of the second write transducer is a bottom pole of the second write transducer.

3. A system as recited in claim 1, wherein the first pole of the first write transducer and a first pole of the second write transducer lie along a common plane, wherein a second pole of the first write transducer and the second pole of the second write transducer lie along a second common plane.

4. A system as recited in claim 3, further comprising a second low reluctance path from the first pole of the second write transducer to a second pole of a third of the write transducers.

5. A system as recited in claim 3, further comprising a second low reluctance path from the second pole of the second write transducer to a first pole of a third of the write transducers.

6. A system as recited in claim 1, wherein the first pole of the first write transducer and the second pole of the second write transducer lie along a common plane, wherein a second pole of the first write transducer lies below the common plane, wherein a first pole of the second write transducer lies above the common plane.

7. A system as recited in claim 6, wherein the low reluctance path further includes a nonmagnetic gap of predefined size, between the first pole of the first write transducer and the second pole of the second write transducer.

8. A system as recited in claim 1, wherein the low reluctance path further includes the nonmagnetic gap.

9. A system as recited in claim 1, wherein the magnetic strap is in physical contact with at least one of the first pole of the first write transducer and the second pole of the second write transducer.

10. A system as recited in claim 9, wherein the nonmagnetic gap is positioned between the magnetic strap and the first pole of the first write transducer.

11. A system as recited in claim 9, wherein the magnetic strap is in physical contact with both the first pole of the first write transducer and the second pole of the second write transducer.

12. A system as recited in claim 11, wherein a nonmagnetic gap is positioned between portions of the magnetic strap.

13. A system as recited in claim 1, wherein the magnetic strap is of a same material as one of the poles.

14. A system as recited in claim 1, wherein the magnetic strap is of a different material than the poles.

15. A system as recited in claim 1, wherein the magnetic strap has a low magnetic permeability, the low magnetic permeability being higher than a magnetic permeability of air and lower than a magnetic permeability of a nearest one of the poles.

16. A system as recited in claim 1, further comprising:
   a drive mechanism for passing a magnetic medium over the write transducers; and
   a controller electrically coupled to the write transducers.

17. A system, comprising:
   at least two write transducers for writing to a magnetic medium,
   wherein a first pole of a first of the write transducers is a top pole of the first write transducer, wherein a second pole of a second of the write transducers is a bottom pole of the second write transducer,
   wherein either 1) the first pole of the first write transducer and the second pole of the second write transducer are positioned close enough to each other that a low reluctance path is present from the first pole of the first write transducer to the second pole of the second write transducer, or 2) a magnetic strap extends between the first pole of the first write transducer and the second pole of the second write transducer thereby creating a low reluctance path therebetween,
   wherein no point of a second pole of the first write transducer and the second pole of the second write transducer lie on a common plane oriented parallel to a plane of deposition of the second pole of the first write transducer.

18. A system as recited in claim 17, wherein the entire second pole of the second write transducer lies above a plane extending across an uppermost surface of the first pole of the first write transducer.

* * * * *